(12) United States Patent
Kuwahara et al.

(10) Patent No.: US 9,842,409 B2
(45) Date of Patent: Dec. 12, 2017

(54) IMAGE TRANSMISSION DEVICE, IMAGE TRANSMISSION METHOD, IMAGE TRANSMISSION PROGRAM, IMAGE RECOGNITION AND AUTHENTICATION SYSTEM, AND IMAGE RECEPTION DEVICE

(71) Applicant: PANASONIC CORPORATION, Osaka (JP)

(72) Inventors: Marie Kuwahara, Fukuoka (JP); Jun Ikeda, Fukuoka (JP); Manabu Nakamura, Fukuoka (JP); Sumio Yokomitsu, Tokyo (JP); Masaya Sato, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 420 days.

(21) Appl. No.: 13/943,898

(22) Filed: Jul. 17, 2013

(65) Prior Publication Data

US 2014/0023247 A1 Jan. 23, 2014

(30) Foreign Application Priority Data

Jul. 19, 2012 (JP) .................................. 2012-160453

(51) Int. Cl.
*G06K 9/00* (2006.01)
*G06T 9/00* (2006.01)
(Continued)

(52) U.S. Cl.
CPC ............. *G06T 9/00* (2013.01); *H04N 19/132* (2014.11); *H04N 19/136* (2014.11);
(Continued)

(58) Field of Classification Search
USPC ........ 340/506; 345/638; 348/398.1, 36, 143; 358/1.15, 462; 375/240.1, 240.29;
(Continued)

(56) References Cited

U.S. PATENT DOCUMENTS 5,809,183 A * 9/1998 Serizawa ............. G06K 9/3233
382/181
5,818,970 A * 10/1998 Ishikawa et al. ............. 382/248
(Continued)

FOREIGN PATENT DOCUMENTS

GB 217922 7/1924
JP 56-022178 3/1981
(Continued)

OTHER PUBLICATIONS

Search report from United Kingdom, mail date is Jan. 28, 2014.

*Primary Examiner* — Xuemei Chen
(74) *Attorney, Agent, or Firm* — Greenblum & Bernstein, P.L.C.

(57) ABSTRACT

An image transmission device includes an image input unit that inputs a plurality of continuous images, a data amount reduction unit that reduces an amount of data of the plurality of images that are input to the image input unit, and generates a data amount reduced image, and a transmission unit that transmits the data amount reduced image to an image reception device that performs a recognition/authentication process with respect to the data amount reduced image. The data amount reduction unit reduces the amount of data of the plurality of images by a reduction method corresponding to the recognition/authentication process that is performed in the image reception device.

19 Claims, 12 Drawing Sheets

(51) Int. Cl.
*H04N 19/172* (2014.01)
*H04N 19/61* (2014.01)
*H04N 19/132* (2014.01)
*H04N 19/136* (2014.01)
*H04N 19/17* (2014.01)

(52) U.S. Cl.
CPC ............ *H04N 19/17* (2014.11); *H04N 19/172* (2014.11); *H04N 19/61* (2014.11); *G06K 9/00993* (2013.01)

(58) Field of Classification Search
USPC ..... 382/103, 118, 195, 240, 248; 455/414.1; 707/783; 726/3, 19
See application file for complete search history.

(56) References Cited

U.S. PATENT DOCUMENTS

| | | | | |
|---|---|---|---|---|
| 5,949,485 | A * | 9/1999 | Oh | 375/240.1 |
| 6,323,877 | B1 * | 11/2001 | Katoh et al. | 345/638 |
| 6,680,745 | B2 * | 1/2004 | Center, Jr. | H04N 7/148 348/14.08 |
| 6,747,554 | B1 * | 6/2004 | Higashimura et al. | 340/506 |
| 6,944,319 | B1 * | 9/2005 | Huang | G06K 9/6282 382/118 |
| 7,116,833 | B2 * | 10/2006 | Brower et al. | 382/240 |
| 7,155,736 | B2 * | 12/2006 | Nagashima | G06Q 30/06 348/E7.056 |
| 7,184,100 | B1 * | 2/2007 | Wilf | G11B 27/28 348/700 |
| 7,310,370 | B2 * | 12/2007 | Faroudja | 375/240.1 |
| 7,313,386 | B2 * | 12/2007 | Kondo et al. | 455/414.1 |
| 7,483,548 | B2 | 1/2009 | Nakano et al. | |
| 7,765,231 | B2 * | 7/2010 | Rathus et al. | 707/783 |
| 8,077,773 | B2 * | 12/2011 | Lancaster et al. | 375/240.01 |
| 8,199,213 | B2 * | 6/2012 | Hattori | G06K 9/00221 348/222.1 |
| 8,264,524 | B1 * | 9/2012 | Davey | 348/36 |
| 8,306,280 | B2 * | 11/2012 | Nozaki et al. | 382/118 |
| 8,363,953 | B2 * | 1/2013 | Kameyama | 382/195 |
| 8,558,888 | B2 * | 10/2013 | Roskowski | 348/143 |
| 8,605,141 | B2 * | 12/2013 | Dialameh | G06F 17/30247 348/157 |
| 8,608,073 | B2 * | 12/2013 | Baqai | G06K 7/1413 235/462.04 |
| 8,625,000 | B2 * | 1/2014 | Shibagami | H04N 1/2112 348/231.2 |
| 8,675,065 | B2 * | 3/2014 | Itoh et al. | 348/143 |
| 8,806,614 | B2 * | 8/2014 | Goto | 726/19 |
| 8,842,726 | B2 * | 9/2014 | Tabuchi et al. | 375/240.01 |
| 8,879,788 | B2 * | 11/2014 | Yamamoto et al. | 382/103 |
| 2001/0035982 | A1 * | 11/2001 | Otsubo et al. | 358/462 |
| 2002/0154331 | A1 * | 10/2002 | Yamauchi et al. | 358/1.15 |
| 2003/0179827 | A1 * | 9/2003 | Sugiyama | 375/240.29 |
| 2006/0224680 | A1 * | 10/2006 | Terayoko | H04L 51/063 709/206 |
| 2006/0250520 | A1 * | 11/2006 | Han et al. | 348/398.1 |
| 2006/0251382 | A1 * | 11/2006 | Vronay | G11B 27/034 386/242 |
| 2009/0003435 | A1 * | 1/2009 | Cho et al. | 375/240.1 |
| 2009/0135252 | A1 * | 5/2009 | Matsuda et al. | 348/143 |
| 2010/0141763 | A1 | 6/2010 | Itoh et al. | |
| 2011/0050901 | A1 * | 3/2011 | Oya | H04N 7/183 348/143 |
| 2011/0055895 | A1 * | 3/2011 | Roskowski et al. | 726/3 |
| 2011/0316964 | A1 * | 12/2011 | Nakanishi | H04N 7/142 348/14.02 |

FOREIGN PATENT DOCUMENTS

| | | |
|---|---|---|
| JP | 2002-191044 | 7/2002 |
| JP | 2002-262288 | 9/2002 |
| JP | 2003-116139 | 4/2003 |
| JP | 2004-310281 | 11/2004 |
| JP | 2005-227957 | 8/2005 |
| JP | 3727798 | 12/2005 |
| JP | 3930504 | 6/2007 |
| JP | 4021873 | 12/2007 |
| JP | 4208450 | 1/2009 |
| JP | 2009-171491 | 7/2009 |
| JP | 4318465 | 8/2009 |
| JP | 4377472 | 12/2009 |
| JP | 2010-136032 | 6/2010 |
| JP | 4578864 | 11/2010 |
| JP | 2012-186567 | 9/2012 |

* cited by examiner

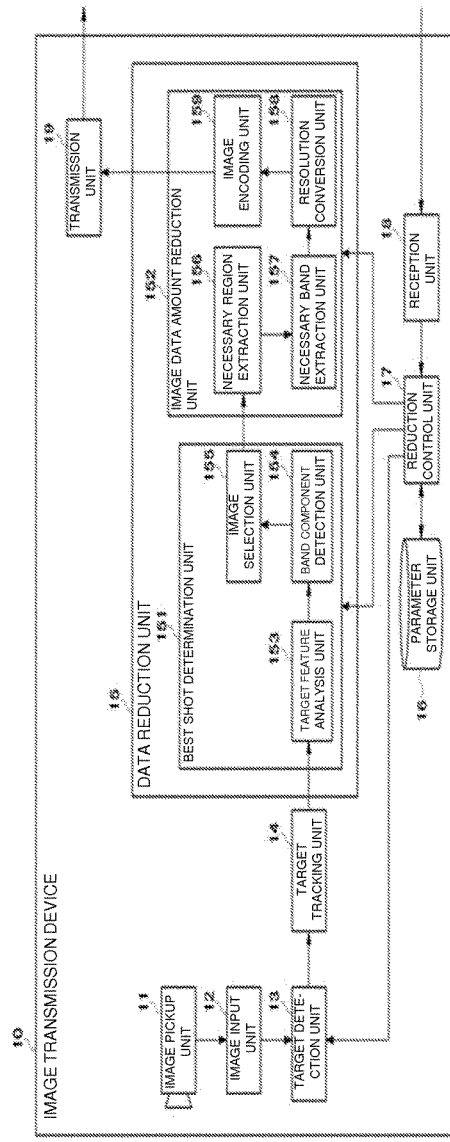
[Fig. 1]

[Fig. 2]
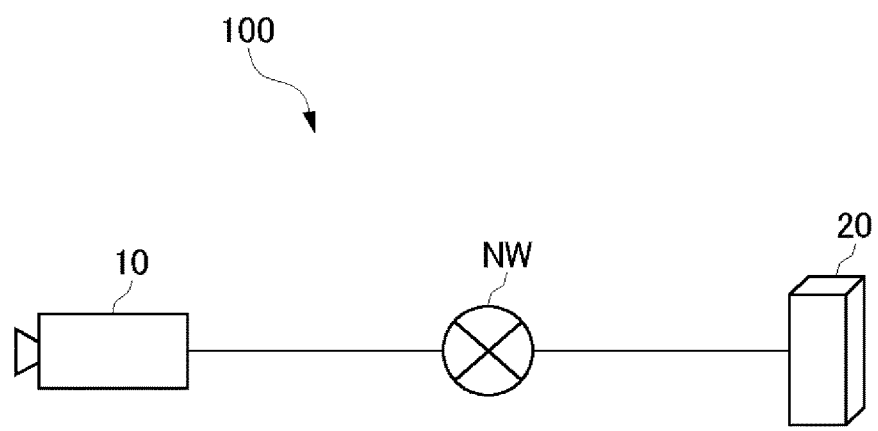

[Fig. 3]
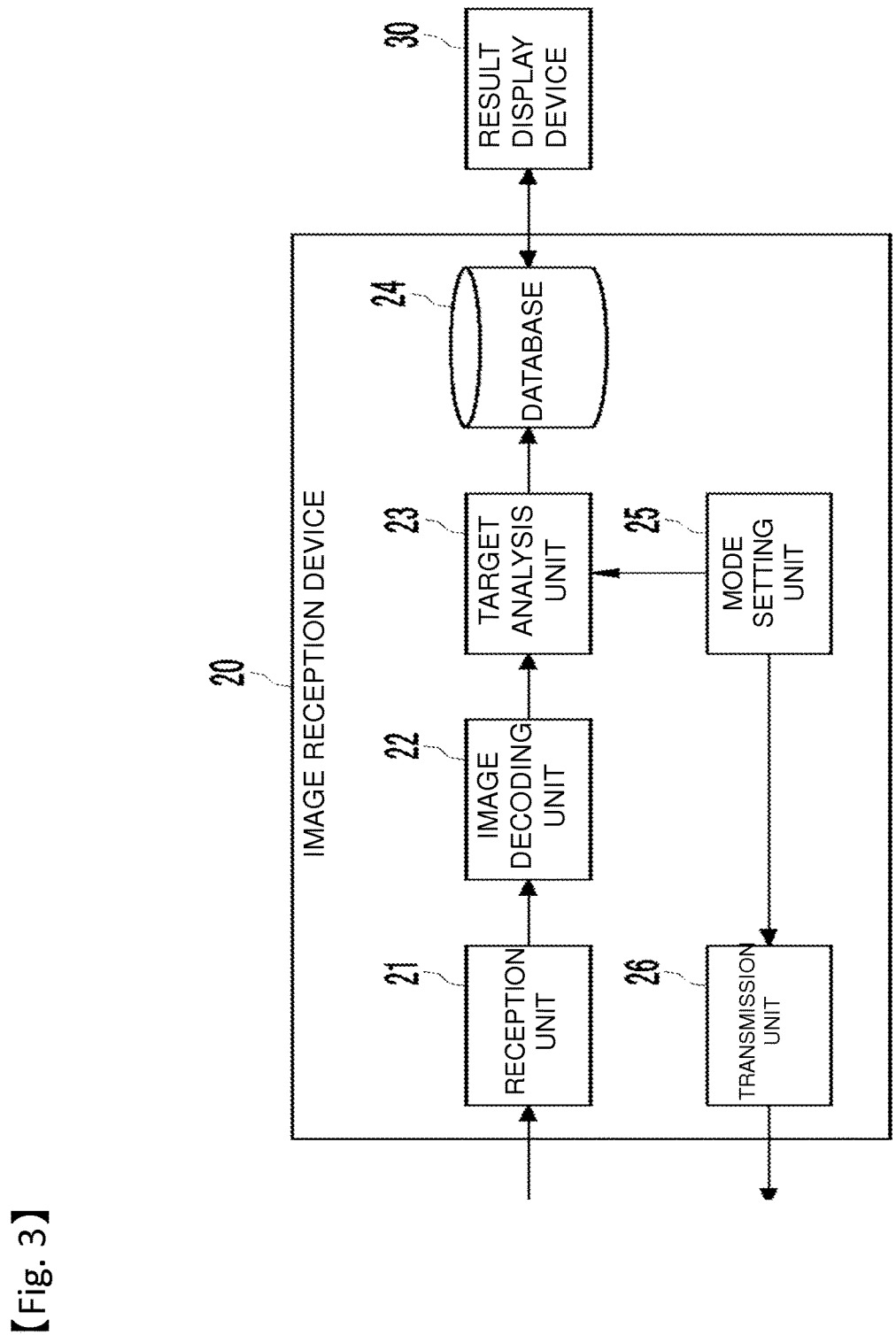

[Fig. 4]
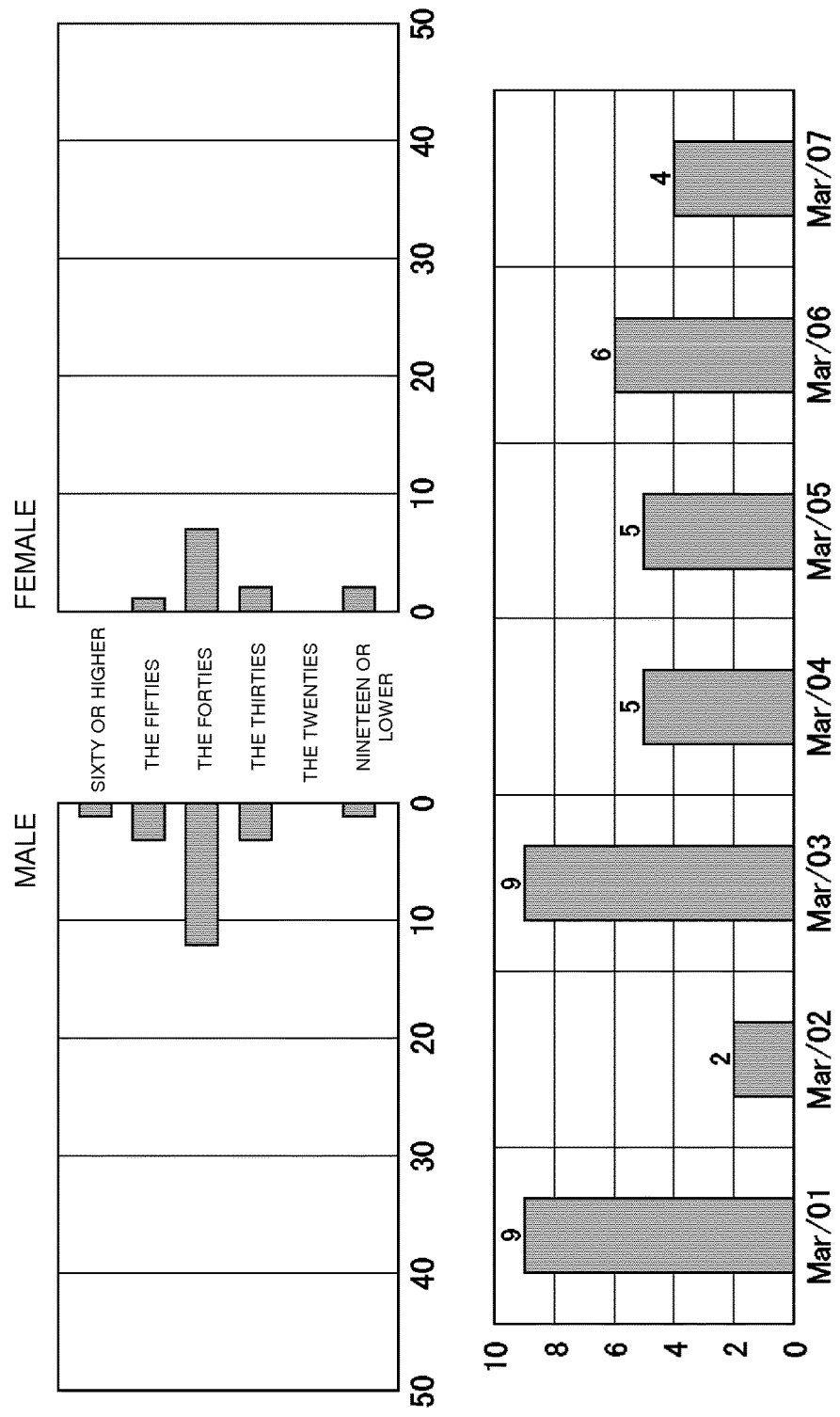

[Fig. 5]
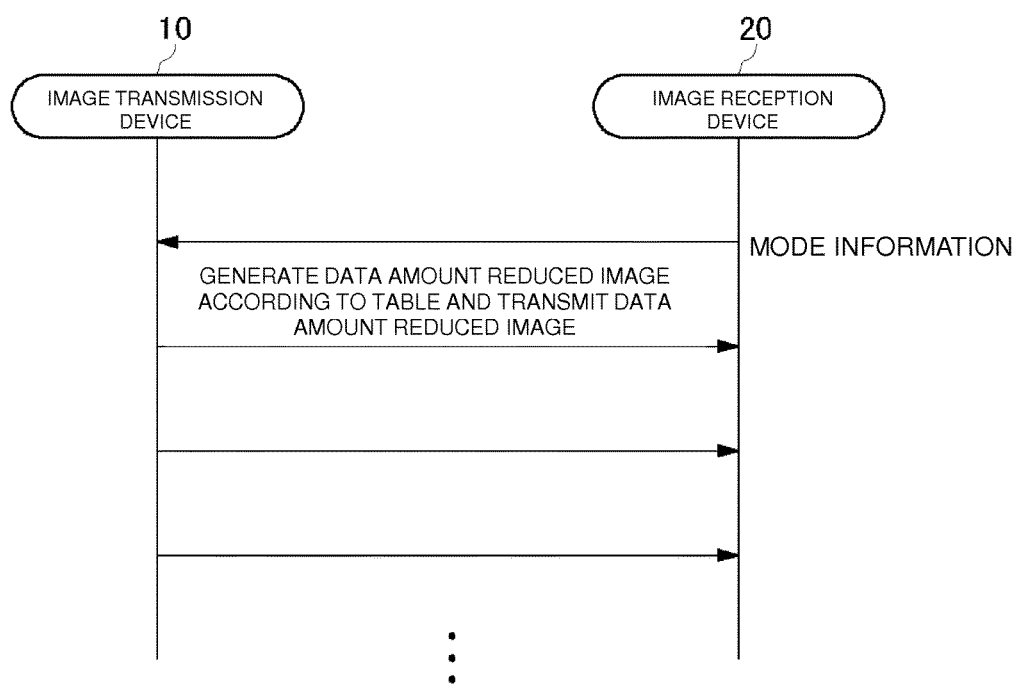

[Fig. 6]
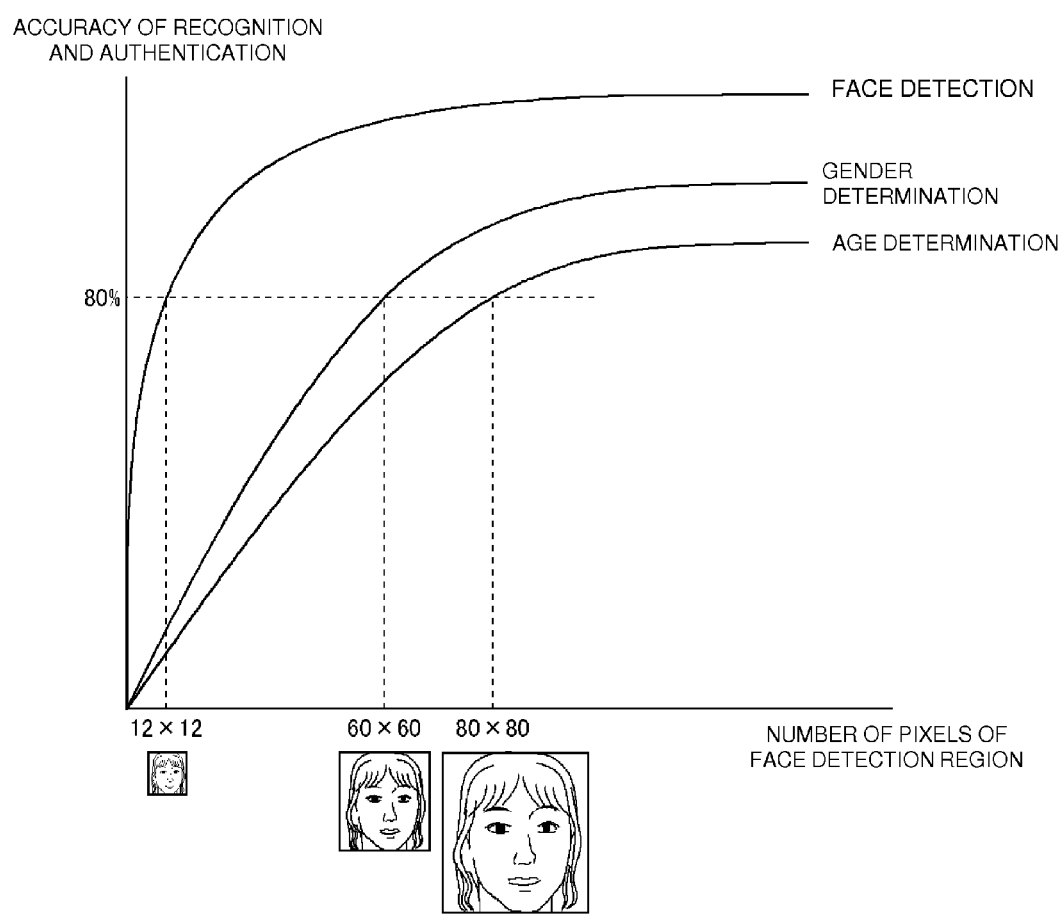

[Fig. 7]

| MODE | AGE DETERMINATION | GENDER DETERMINATION | PERSON AUTHENTICATION | FASHION POPULARITY ANALYSIS | BODY TYPE DETERMINATION | RACE DETERMINATION | ... | VEHICLE TYPE DETERMINATION | NUMBER DETERMINATION | PET DETERMINATION | PERSON THUMBNAIL DISPLAY |
|---|---|---|---|---|---|---|---|---|---|---|---|
| DETECTION TARGET | PERSON | PERSON | PERSON | PERSON | PERSON | PERSON | ... | VEHICLE | VEHICLE | PET | PERSON |
| ANALYSIS TARGET | FACE IMAGE | FACE IMAGE | FACE IMAGE | CLOTH IMAGE AND SHOE IMAGE | PERSON IMAGE | FACE IMAGE | ... | VEHICLE IMAGE | NUMBER PLATE | PET IMAGE (DOG, CAT, AND THE LIKE) | FACE IMAGE |
| BAND | HIGH FREQUENCY | MIDDLE FREQUENCY | HIGH FREQUENCY | MIDDLE FREQUENCY | LOW FREQUENCY | LOW FREQUENCY | ... | HIGH FREQUENCY | MIDDLE FREQUENCY | MIDDLE FREQUENCY | MIDDLE FREQUENCY |
| REGION | FACE REGION ONLY | FACE REGION INCLUDING HAIR AND NECK | FACE REGION INCLUDING HAIR | CLOTH REGION AND SHOE REGION | WHOLE BODY | FACE REGION ONLY | ... | ENTIRETY OF VEHICLE | NUMBER PLATE | WHOLE BODY | FACE + PERIPHERAL REGION |
| RESOLUTION | HIGH RESOLUTION | MIDDLE RESOLUTION | HIGH RESOLUTION | MIDDLE RESOLUTION | LOW RESOLUTION | HIGH RESOLUTION | ... | MIDDLE RESOLUTION | MIDDLE RESOLUTION | MIDDLE RESOLUTION | LOW RESOLUTION |
| IMAGE QUALITY | HIGH IMAGE QUALITY | MIDDLE IMAGE QUALITY | HIGH IMAGE QUALITY | MIDDLE IMAGE QUALITY | LOW IMAGE QUALITY | HIGH IMAGE QUALITY | ... | HIGH IMAGE QUALITY | MIDDLE IMAGE QUALITY | MIDDLE IMAGE QUALITY | MIDDLE IMAGE QUALITY |

[Fig. 8]
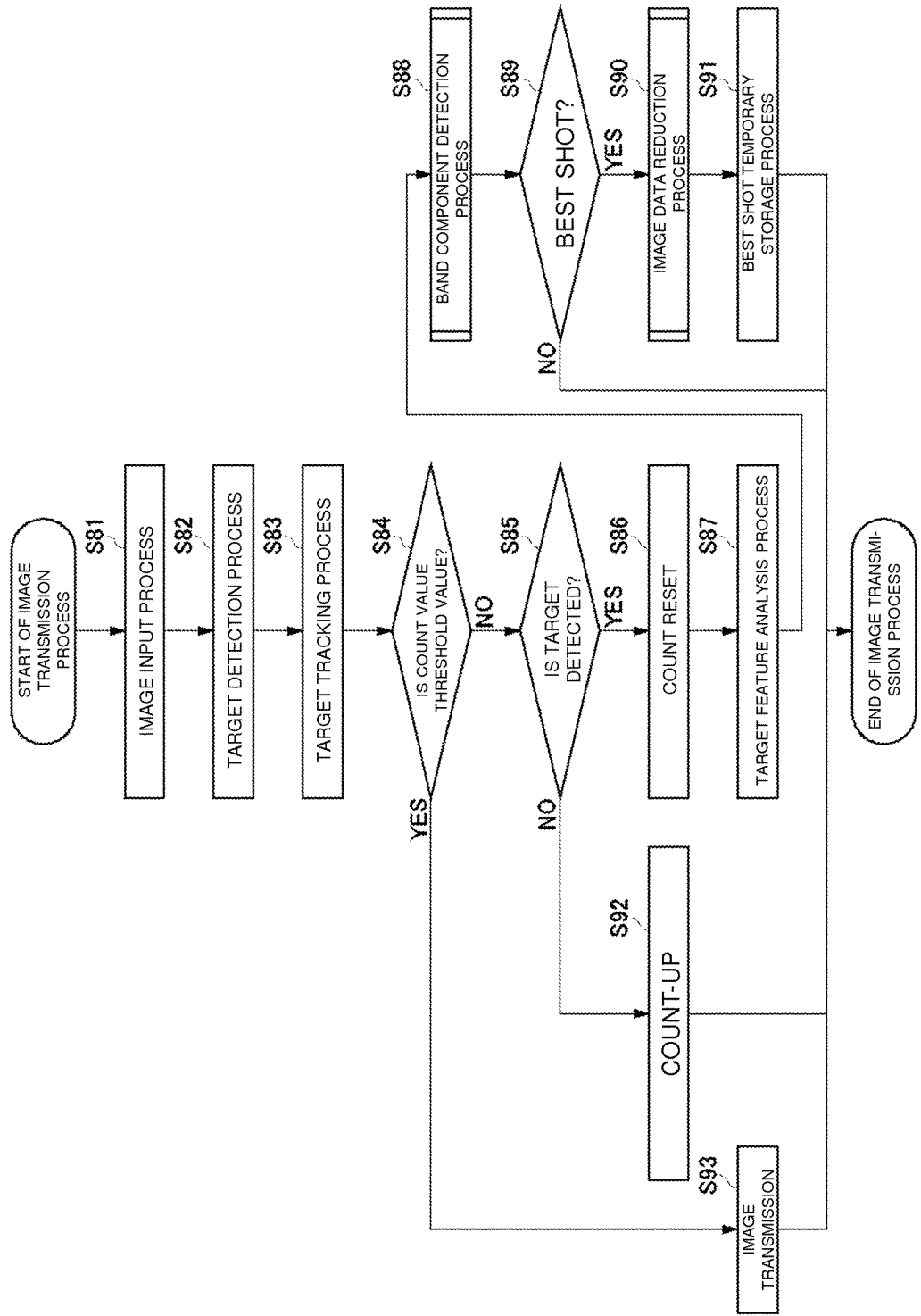

[Fig. 9]
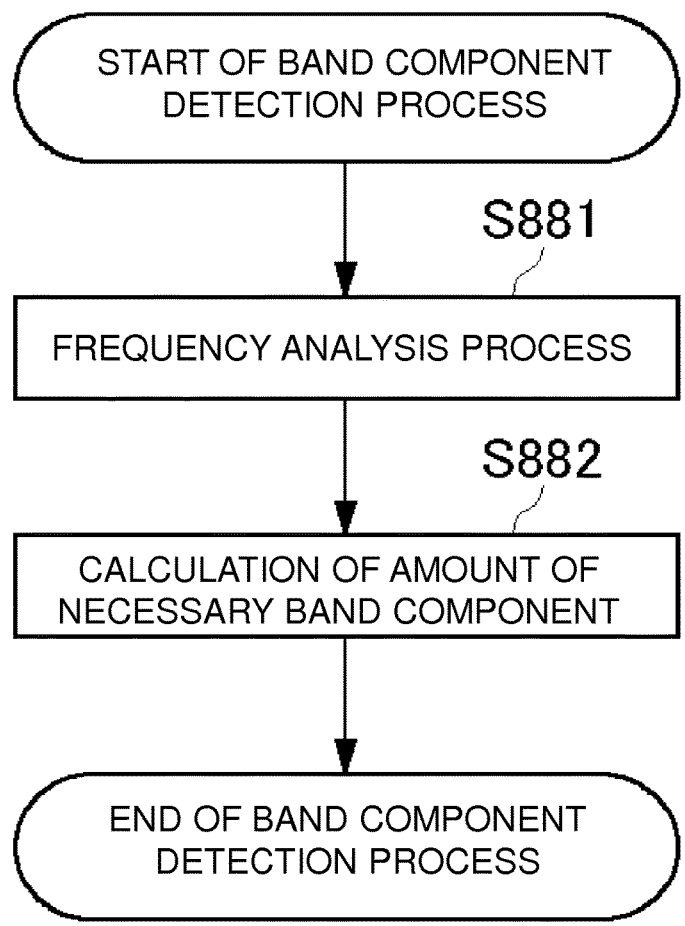

[Fig. 10]
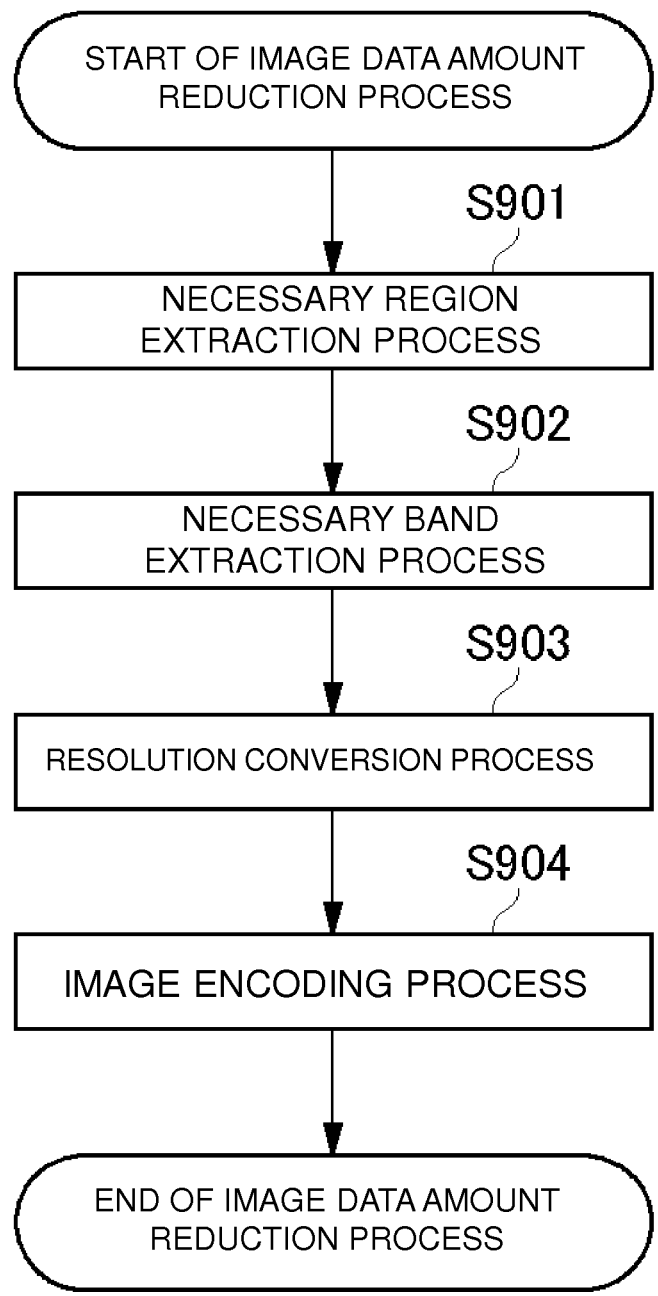

[Fig. 11]
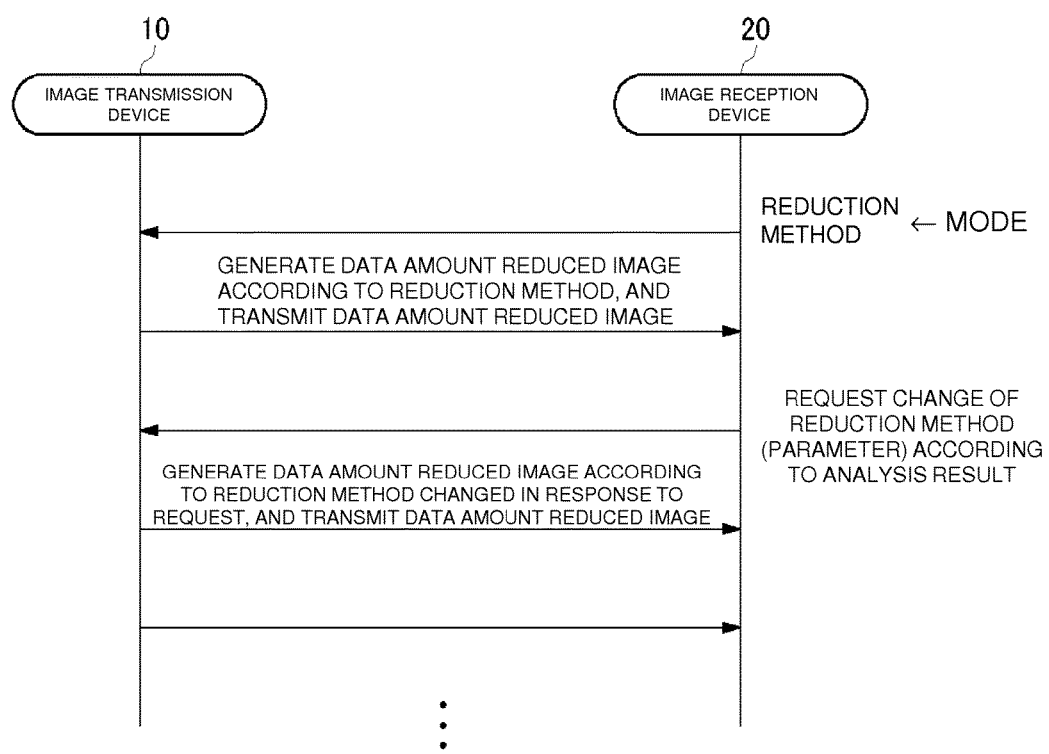

[Fig. 12]
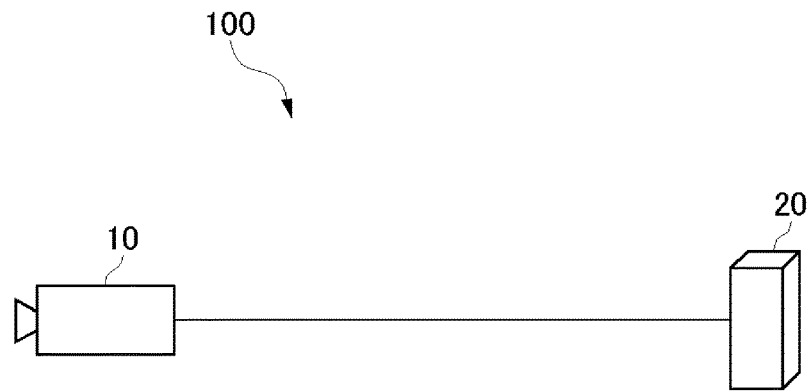
[Fig. 13]
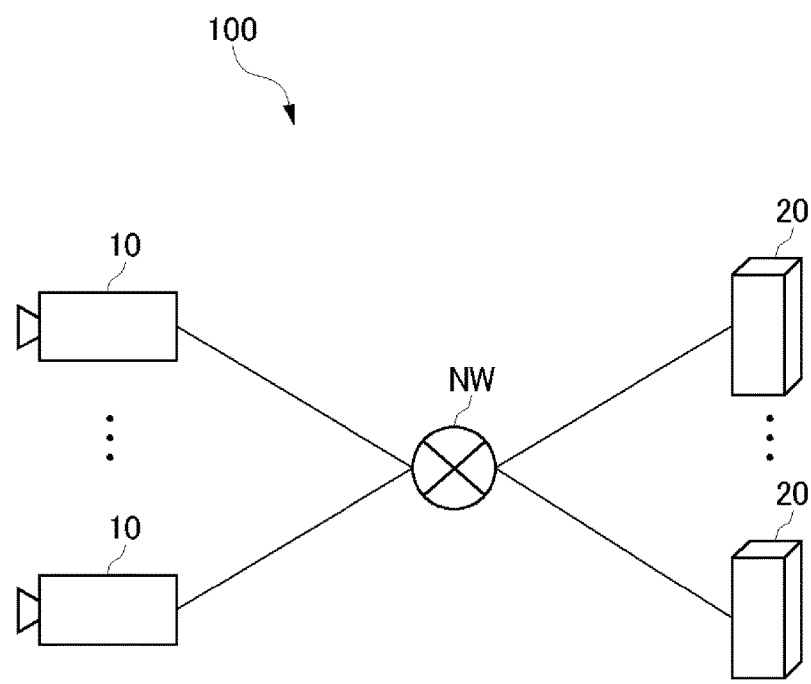

IMAGE TRANSMISSION DEVICE, IMAGE TRANSMISSION METHOD, IMAGE TRANSMISSION PROGRAM, IMAGE RECOGNITION AND AUTHENTICATION SYSTEM, AND IMAGE RECEPTION DEVICE

CROSS REFERENCE TO RELATED APPLICATION

Priority is claimed on Japanese Patent Application No. 2012-160453, filed Jul. 19, 2012, the content of which is incorporated herein by reference.

BACKGROUND

Technical Field

The present invention relates to an image recognition/authentication system that performs recognition and/or authentication of continuously input images, an image transmission device and an image reception device that constitute the image recognition/authentication system, an image transmission method, and an image transmission program.

Related Art

As an image recognition/authentication system that includes a camera and a server in the related art, there is known an image recognition/authentication system that transmits an image obtained by photographing in the camera to the server, and performs a recognition process and/or an authentication process (hereinafter, referred to as a "recognition/authentication process") of an object based on the image in the server. For example, there is known an image recognition/authentication system in which a person is photographed with a monitoring camera, detection of a recognition target (face), determination of age or gender, personal authentication, and the like are performed as a recognition/authentication process.

In the related art, continuous images (moving images) are photographed with a camera to generate a plurality of the continuous images, all of the images are transmitted to a server, and the recognition/authentication process is performed on a server side with respect to all of the images (frames) that are received. In this manner, when all of the images are transmitted to the server to perform the recognition/authentication process of the images, a transmission amount of the images increases, and thus a load applied to the network increases. In addition, a processing load of the server increases, and a capacity for accumulating the images received by the server increases. As a result, the cost of the server increases.

In contrast, a technology in which a detection process of a recognition target is performed on a camera side with respect to the plurality of continuous images, and only images in which the recognition target is detected are transmitted to a server is suggested. In this manner, when only the images in which the recognition target is detected are transmitted from the camera to the server, the above-described network load and the cost of the server may be reduced.

Furthermore, as a technology of reducing the network load and the cost of the server, a technology in which detection process of the recognition target is performed on a camera side with respect to the plurality of continuous images, and among the images in which the recognition target is detected, only the best image is selected and is transmitted to the server is suggested (for example, Japanese Patent Nos. 3727798, 4208450, 4021873, and 4377472). According to this technology, since the number of images to be transmitted from the camera side to the server may be limited, the network load and the cost of the server may be further reduced.

SUMMARY

However, in the related art, since the images that are selected on the camera side and are transmitted to the server are not necessarily images that are suitable for the recognition/authentication process in the server, when the number of images that are transmitted from the camera to the server and are subjected to the recognition/authentication process is limited, there is a problem in that accuracy of recognition/authentication decreases.

In addition, along with the request for no decrease in accuracy of recognition/authentication as described above, there is also a request for reducing the network load and the cost of the server.

The invention has been made in consideration of the above-described problems, and an object thereof is to reduce a network load and the cost of a server in an image recognition/authentication system which transmits images obtained by photographing in a camera to a server, and performs a recognition/authentication process of an object based on images in the server.

In addition, another object of the invention is to provide an image recognition/authentication system which transmits images obtained by photographing in a camera to a server, and performs a recognition/authentication process of an object based on images in the server, and which is capable of reducing the network load and the cost of the server, and suppressing a decrease in accuracy of recognition/authentication due to the reduction.

According to an aspect of the invention, there is provided an image transmission device including: an image input unit that inputs a plurality of continuous images; a data amount reduction unit that reduces an amount of data of the plurality of images that are input to the image input unit, and generates a data amount reduced image; and a transmission unit that transmits the data amount reduced image to an image reception device that performs a recognition/authentication process with respect to the data amount reduced image. The data amount reduction unit reduces the amount of data of the plurality of images by a reduction method corresponding to the recognition/authentication process that is performed in the image reception device.

In addition, according to another aspect of the invention, there is provided an image transmission method including: an image input step of inputting a plurality of continuous images; a data amount reduction step of reducing an amount of data of the plurality of images that are input, and generating a data amount reduced image; and a transmission step of transmitting the data amount reduced image to an image reception device that performs a recognition/authentication process with respect to the data amount reduced image. In the data amount reduction step, the amount of data of the plurality of images is reduced by a reduction method corresponding to the recognition/authentication process that is performed in the image reception device.

According to still another aspect of the invention, there is provided an image transmission program that allows a computer to function as: an image input unit that inputs a plurality of continuous images; a data amount reduction unit that reduces an amount of data of the plurality of images that are input to the image input unit, and generates a data amount reduced image; and a transmission unit that transmits the data amount reduced image to an image reception device that performs a recognition/authentication process with respect to the data amount reduced image. The data amount reduction unit reduces the amount of data of the plurality of images by a reduction method corresponding to the recognition/authentication process that is performed in the image reception device.

In addition, according to still another aspect of the invention, there is provided an image recognition/authentication system including an image transmission device, and an image reception device. The image transmission device includes an image input unit that inputs a plurality of continuous images, a data amount reduction unit that reduces an amount of data of the plurality of images that are input to the image input unit, and generates a data amount reduced image, and a transmission unit that transmits the data amount reduced image to the image reception device. The image reception device includes a reception unit that receives the data amount reduced image transmitted from the transmission unit, and a recognition/authentication processing unit that performs a recognition/authentication process with respect to the data amount reduced image received in the reception unit. The data amount reduction unit reduces the amount of data of the plurality of images by a reduction method corresponding to the recognition/authentication process that is performed in the recognition/authentication processing unit.

According to still another aspect of the invention, there is provided an image reception device including: a reception unit that receives an image transmitted from an image transmission device; a recognition/authentication processing unit that performs a recognition/authentication process with respect to the image received in the reception unit; and a transmission unit that transmits mode information of the recognition/authentication process that is performed in the recognition/authentication processing unit to the image transmission device.

According to still another aspect of the invention, there is provided an image reception device including: a reception unit that receives an image transmitted from an image transmission device; a recognition/authentication processing unit that performs a recognition/authentication process with respect to the image that is received in the reception unit; a storage unit that stores correspondence between mode information of the recognition/authentication process that is performed in the recognition/authentication processing unit, and an image generation method of generating an image; an image generation control unit that determines the image generation method with reference to the storage unit according to mode information that is set; and a transmission unit that transmits information indicating the image generation method determined in the image generation control unit to the image transmission device.

As described below, other aspects are present in the invention. Accordingly, the disclosure of the invention is intended to provide parts of the invention, and is not intended to limit scope of the invention that is described and claimed herein.

According to the invention, since the amount of data of images that are transmitted from the image transmission device to the image reception device is reduced by a method according to the recognition/authentication process, the network load and the cost of a server may be reduced, and a decrease in accuracy of the recognition/authentication process due to the reduction of the amount of data may be suppressed.

BRIEF DESCRIPTION OF DRAWINGS

FIG. 1 is a block diagram illustrating a configuration of an image transmission device according to an embodiment;

FIG. 2 is a block diagram illustrating a configuration of an image recognition/authentication system according to the embodiment;

FIG. 3 is a block diagram illustrating a configuration of an image reception device according to the embodiment;

FIG. 4 is a diagram illustrating a display example of analysis results according to the embodiment;

FIG. 5 is a diagram illustrating designation of mode information from the image reception device with respect to the image transmission device according to the embodiment;

FIG. 6 is a graph illustrating an example of a relation between resolution (the number of pixels) and accuracy of recognition/authentication according to the embodiment;

FIG. 7 is a table illustrating an example of a table that is stored in a parameter storage unit according to the embodiment;

FIG. 8 is a flow diagram of an image transmission method in the image transmission device according to the embodiment;

FIG. 9 is a flow diagram illustrating a band component detection process in a band component detection unit according to the embodiment;

FIG. 10 is a flow diagram illustrating an image data amount reduction process in an image data amount reduction unit according to the embodiment;

FIG. 11 is a diagram illustrating parameter designation from the image reception device with respect to the image transmission device according to the embodiment;

FIG. 12 is a diagram illustrating another example of the system configuration of the image recognition/authentication system according to the embodiment; and FIG. 13 is a diagram illustrating still another example of the system configuration of the image recognition/authentication system according to the embodiment.

DETAILED DESCRIPTION

Hereinafter, the invention will be described in detail. The following embodiment is a simple example of the invention, and may be modified into various aspects. Accordingly, the following specific configuration and function are not intended to limit claims. In this specification, a term of "recognition/authentication" is used to represent meaning of "recognition and/or authentication".

An image transmission device of the embodiment is configured to include an image input unit that inputs a plurality of continuous images, a data amount reduction unit that reduces an amount of data of the plurality of images that are input to the image input unit, and generates a data amount reduced image, and a transmission unit that transmits the data amount reduced image to an image reception device that performs a recognition/authentication process with respect to the data amount reduced image. The data amount reduction unit reduces the amount of data of the plurality of images by a reduction method corresponding to the recognition/authentication process that is performed in the image reception device.

According to this configuration, since the amount of data of images that are transmitted from the image transmission device to the image reception device is reduced by a method corresponding to the recognition/authentication process, the network load and the cost of a server may be reduced, and a decrease in accuracy of the recognition/authentication process due to the reduction of the amount of data may be suppressed.

In the image transmission device, the data amount reduction unit may reduce the amount of data of the plurality of images by selecting parts of images among the plurality of images with a reference corresponding to the recognition/authentication process that is performed in the image reception device.

According to this configuration, since parts of images are selected among a plurality of images input to the image input unit, the network load and the cost of a server may be reduced compared to a case of transmitting all of the images input to the image input unit. In addition, since the image selection is performed with a reference corresponding to the recognition/authentication process, a decrease in accuracy of the recognition/authentication process due to limitation of the number of images that become a target of the recognition/authentication process in the image reception device may be suppressed.

In the image transmission device, the data amount reduction unit may reduce the amount of data of the plurality of images by trimming a region of the plurality of images or the parts of images selected among the plurality of images, the region corresponding to the recognition/authentication process performed in the image reception device.

According to this configuration, since the trimming is performed with respect to the plurality of images or parts of images selected among the plurality of images, the amount of data is reduced compared to a case of transmitting the entirety of the images input to the image input unit, and thus the network load and the cost of a server may be reduced. In addition, since the trimming is performed by a method corresponding to the recognition/authentication process, a decrease in accuracy of the recognition/authentication process due to the reduction of the amount of data may be suppressed.

In the image transmission device, the data amount reduction unit may reduce the amount of data of the plurality of images by extracting a band component of the plurality of images or the parts of images selected among the plurality of images, the band component corresponding to the recognition/authentication process performed in the image reception device.

According to this configuration, since a part of band component is extracted with respect to the plurality of images or the parts of images selected among the plurality of images, the amount of data is reduced compared to a case of transmitting the entirety of band component of the images input to the image input unit, and thus the network load and the cost of a server may be reduced. In addition, since the band component that is extracted is a band component corresponding to the recognition/authentication process, a decrease in accuracy of the recognition/authentication process due to the reduction of the amount of data may be suppressed.

In the image transmission device, the data amount reduction unit may reduce the amount of data of the plurality of images by converting resolution of the plurality of images or the parts of images selected among the plurality of images to resolution corresponding to the recognition/authentication process performed in the image reception device.

According to this configuration, since the plurality of images or the parts of images selected among the plurality of images are subjected to resolution conversion (compression), the amount of data is reduced compared to a case of transmitting the images input to the image input unit without performing resolution conversion (compression), and thus the network load and the cost of a server may be reduced. In addition, since the resolution conversion is performed to resolution corresponding to the recognition/authentication process, an excessive decrease in accuracy of the recogni-tion/authentication process due to the reduction of the amount of data may be suppressed.

In the image transmission device, the data amount reduction unit may reduce the amount of data of the plurality of images by encoding the plurality of images or the parts of images selected among the plurality of images in an encoding rate corresponding to the recognition/authentication process performed in the image reception device.

According to this configuration, since the plurality of images or the parts of images selected among the plurality of images are encoded, the amount of data is reduced compared to a case of transmitting the images input to the image input unit without performing encoding, and thus the network load and the cost of a server may be reduced. In addition, since the encoding is performed in an encoding rate corresponding to the recognition/authentication process, an excessive decrease in accuracy of the recognition/authentication process due to the reduction of the amount of data may be suppressed.

The image transmission device may further include a reception unit that receives mode information of the recognition/authentication process performed in the image reception device, a storage unit that stores correspondence between the mode information and the reduction method, and a reduction control unit that determines the reduction method corresponding to the mode information received in the reception unit with reference to the storage unit. The data amount reduction unit may generate the data amount reduced image according to the reduction method determined in the reduction control unit.

According to this configuration, the image transmission device receives the mode information of the recognition/authentication process from the image reception device, the amount of data of the images is reduced by a reduction method corresponding to the mode information, and a data amount reduced image is generated. Accordingly, a decrease in accuracy of the recognition/authentication process in the image reception device may be suppressed.

The image transmission device may further include a reception unit that receives information indicating the reduction method. The data amount reduction unit may generate the data amount reduced image according to the reduction method indicated by the information received in the reception unit.

According to this configuration, the image transmission device receives the information indicating the reduction method from the image reception device, and the amount of data of the images is reduced by the reduction method to generate a data amount reduced image. Accordingly, a decrease in accuracy of the recognition/authentication process in the image reception device may be suppressed.

An image transmission method of the embodiment includes an image input step of inputting a plurality of continuous images, a data amount reduction step of reducing an amount of data of the plurality of images that are input, and generating a data amount reduced image, and a transmission step of transmitting the data amount reduced image to an image reception device that performs a recognition/authentication process with respect to the data amount reduced image. In the data amount reduction step, the amount of data of the plurality of images is reduced by a reduction method corresponding to the recognition/authentication process that is performed in the image reception device.

According to this configuration, since the amount of data of images transmitted from the image transmission device to the image reception device is reduced by a method corresponding to the recognition/authentication process, the network load and the cost of a server may be reduced, and a decrease in accuracy of the recognition/authentication process due to the reduction of the amount of data may be suppressed.

An image transmission program of the embodiment is an image transmission program allowing a computer to function as an image input unit that inputs a plurality of continuous images, a data amount reduction unit that reduces an amount of data of the plurality of images that are input to the image input unit, and generates a data amount reduced image, and a transmission unit that transmits the data amount reduced image to an image reception device that performs a recognition/authentication process with respect to the data amount reduced image. The data amount reduction unit reduces the amount of data of the plurality of images by a reduction method corresponding to the recognition/authentication process that is performed in the image reception device.

According to this configuration, since the amount of data of the images transmitted from the image transmission device to the image reception device is reduced by a method corresponding to the recognition/authentication process, the network load and the cost of a server may be reduced, and a decrease in accuracy of the recognition/authentication process due to the reduction of the amount of data may be suppressed.

An image recognition/authentication system of the embodiment is an image recognition/authentication system including an image transmission device and an image reception device. The image transmission device is configured to include an image input unit that inputs a plurality of continuous images, a data amount reduction unit that reduces an amount of data of the plurality of images that are input to the image input unit, and generates a data amount reduced image, and a transmission unit that transmits the data amount reduced image to the image reception device. The image reception device is configured to include a reception unit that receives the data amount reduced image transmitted from the transmission unit, and a recognition/authentication processing unit that performs a recognition/authentication process with respect to the data amount reduced image received in the reception unit. The data amount reduction unit reduces the amount of data of the plurality of images by a reduction method corresponding to the recognition/authentication process that is performed in the recognition/authentication processing unit.

According to this configuration, the amount of data of images transmitted from the image transmission device to the image reception device is reduced by a method corresponding to the recognition/authentication process, the network load and the cost of a server may be reduced, and a decrease in accuracy of the recognition/authentication process due to the reduction of the amount of data may be suppressed.

An image reception device of the embodiment is configured to include a reception unit that receives an image transmitted from an image transmission device, a recognition/authentication processing unit that performs a recognition/authentication process with respect to the image received in the reception unit, and a transmission unit that transmits mode information of the recognition/authentication process that is performed in the recognition/authentication processing unit to the image transmission device.

According to this configuration, since the mode information of the recognition/authentication process is transmitted to the image transmission device that transmits the images, the image transmission device may generate an image by an image generation method corresponding to the mode information. Accordingly, a decrease in accuracy of the recognition/authentication process in the recognition/authentication processing unit may be suppressed.

An image reception device of another embodiment is configured to include a reception unit that receives an image transmitted from an image transmission device, a recognition/authentication processing unit that performs a recognition/authentication process with respect to the image that is received in the reception unit, a storage unit that stores correspondence between mode information of the recognition/authentication process that is performed in the recognition/authentication processing unit, and an image generation method of generating an image, an image generation control unit that determines the image generation method with reference to the storage unit according to mode information that is set, and a transmission unit that transmits information indicating the image generation method determined in the image generation control unit to the image transmission device.

According to this configuration, since an image generation method corresponding to mode information of the recognition/authentication process is notified to the image transmission device that transmits images, the image transmission device may generate images according to the image generation method. Accordingly, a decrease in accuracy of the recognition/authentication process in the recognition/authentication processing unit may be suppressed.

Hereinafter, the image recognition/authentication system of the embodiment of the invention will be described with reference to the drawings. FIG. 2 illustrates a block diagram illustrating a configuration of the image recognition/authentication system of the embodiment of the invention. As illustrated in FIG. 2, an image recognition/authentication system 100 includes an image transmission device 10, and an image reception device 20. The image transmission device 10 and the image reception device 20 are connected to each other via the network NW, and thus various pieces of data may be transmitted from the image transmission device 10 to the image reception device 20, or from the image reception device 20 to the image transmission device 10. Particularly, images are acquired by photographing in the image transmission device 10, and the images are transmitted to the image reception device 20. In the image reception device 20, a recognition/authentication process of a target is performed with respect to the images received from the image transmission device 10.

In FIG. 2, the image transmission device 10 and the image reception device 20 are connected to the network NW by a wire, respectively. However, the image transmission device 10 and the image reception device 20 may be wirelessly connected to the network NW. Particularly, in a case where the image transmission device 10 is made movable, it is preferable that the image transmission device 10 be configured to be wirelessly connected to the network NW.

When the following mode is set, the image recognition/authentication system 100 may be used for various kinds of usage. The image recognition/authentication system 100 is applicable as a monitoring system, a marketing information collecting system, a vehicle recognition system, and the like. For example, in the case of the monitoring system, the image transmission device 10 is provided at a monitoring target site, the image reception device 20 is provided at a monitoring center distant from the monitoring target site, and recognition/authentication of a face of a person that is a monitoring target is performed. In addition, for example, in the case of the vehicle recognition system, the image transmission device 10 is provided at a parking lot exit of facilities. The image reception device 20 is provided at a control room in the facilities, and is connected to a parking fee payment device provided in the facilities. A recognition/authentication process of a vehicle number is performed to perform opening and shutting of a gate of the parking lot exit.

FIG. 1 illustrates a block diagram illustrating a configuration of an image transmission device that constitutes the image recognition/authentication system of the embodiment of the invention. As illustrated in FIG. 1, the image transmission device 10 includes an image pickup unit 11, an image input unit 12, a target detection unit 13, a target tracking unit 14, a data reduction unit 15, a parameter storage unit 16, a reduction control unit 17, a reception unit 18, and a transmission unit 19. The image transmission device 10 is constituted as a digital video camera.

The image pickup unit 11 includes a lens, an aperture, an image pickup element, and a signal processing circuit. The image pickup unit 11 photographs an object that is a target of the recognition/authentication process, and generates images. The image pickup unit 11 photographs moving images, and generates continuous (for example, 30 frames per second) images. The image pickup unit 11 outputs the generated images to the image input unit 12.

The image input unit 12 continuously input images that are output from the image pickup unit 11. The target detection unit 13 performs analysis with respect to the images input to the image input unit 12 to detect a predetermined recognition/authentication target (hereinafter, referred to simply as "target"). Examples of the target include a person, a face of the person, a number plate of a vehicle, cloth, shoes, and the like. A specific target is designated by the reduction control unit 17 to be described later. For the detection of the target, technologies in the related art (for example, refer to U.S. Pat. No. 7,483,548, Japanese Patent No. 3930504, and the like) may be used. Here, the contents of U.S. Pat. No. 7,483,548, Japanese Patent No. 3930504 are incorporated herein by reference.

The target tracking unit 14 tracks a target that is detected by the target detection unit 13, and integrates the same targets in a time series direction. For the tracking of the target, technologies in the related art (for example, refer to JP 2004-310281 A, Japanese Patent Nos. 3930504 and 4578864, and the like) may be used. Here, the contents of JP 2004-310281 A, and Japanese Patent Nos. 3930504 and 4578864 are incorporated herein by reference.

The data reduction unit 15 reduces an amount of data of a plurality of continuous images that are input, and generates a data amount reduced image. The data reduction unit 15 reduces the amount of data of images that are transmitted from the image transmission device 10 to the image reception device 20 by selecting parts of images from the plurality of continuous images, and reducing the amount of data of the selected images themselves. That is, the data reduction unit 15 reduces the amount of data of images that are transmitted from the image transmission device 10 to the image reception device 20 by transmitting only images that are determined as a best shot (reducing the number of images that are transmitted) instead of transmitting all of the plurality of images that are input to the image reception device 20. In addition, with regard to the images that are transmitted, after the amount of data of the images themselves is reduced by the image transmission device 10, the images are transmitted to the image reception device 20. Accordingly, according to this configuration, the amount of data of images that are transmitted from the image transmission device 10 to the image reception device 20 is also reduced.

The data reduction unit 15 includes a best shot determination unit 151 as a configuration that reduces the number of images that are transmitted, and an image data amount reduction unit 152 as a configuration that reduces the amount of data of images themselves that are transmitted. The best shot determination unit 151 and the image data amount reduction unit 152 reduce the amount of data of images that are transmitted by a reduction method suitable for the recognition/authentication process in the image reception device 20, respectively. Therefore, the image transmission device 10 is provided with the parameter storage unit 16, the reduction control unit 17, and the reception unit 18.

The reception unit 18 receives mode information of the recognition/authentication process from the image reception device 20. The mode information corresponds to the above-described various kinds of usage of the image recognition/authentication system 100. The mode information and various kinds of reduction parameters are stored in the parameter storage unit 16 in correlation with each other. The reduction control unit 17 reads out a reduction parameter corresponding to the mode information received by the reception unit 18 from the parameter storage unit 16, and sets a parameter that is used for various kinds of processes of the target detection unit 13 and the data reduction unit 15. A relation between the mode information and the reduction parameter, and various kinds of processes in which the reduction parameter is used will be described later.

The best shot determination unit 151 includes a target feature analysis unit 153, a band component detection unit 154, and an image selection unit 155. The target feature analysis unit 153 performs feature analysis with respect to a target that is detected in the target detection unit 13, and calculates a degree of reliability (for example, a face identity), a direction of a target object (for example, a direction of a face), and the like. For the feature analysis, technologies in the related art (for example, refer to JP 2005-227957 A, and the like) may be used. Here, the content of JP 2005-227957 A is incorporated herein by reference. The band component detection unit 154 detects a band component that is regarded as important at the recognition/authentication process performed in the image reception device 20 according to the reduction parameter set by the reduction control unit 17.

The image selection unit 155 selects a best shot (best image) among a plurality of images including the same target based on results of feature analysis by the target feature analysis unit 153 and results of a band component detection by the band component detection unit 154, and outputs the best shot to the image data amount reduction unit 152 (hereinafter, an image that is selected by the best shot determination unit 151 is referred to as "selected image"). Specifically, it is determined that any one of the degree of reliability or direction that is obtained by the target feature analysis unit 153, and the band component obtained by the band component detection unit 154 is regarded as important to a certain degree according to a parameter set by the reduction control unit 17, and an image is selected with this determination result made as a reference. For example, in a case where age determination is performed as the recognition/authentication process in the image reception device 20, the image selection unit 155 selects an image with a reference in which an image including a lot of high-frequency components than the direction of a face is regarded as important.

The image data amount reduction unit 152 includes a necessary region extraction unit 156, a necessary band extraction unit 157, a resolution conversion unit 158, and an image encoding unit 159. The necessary region extraction unit 156 calculates and extracts (trims) a region, which is very suitable to perform the recognition/authentication process in the image reception device 20, from the selected image according to the reduction parameter set by the reduction control unit 17. The necessary band extraction unit 157 calculates and extracts a band, which is very suitable to perform the recognition/authentication process in the image reception device 20, from the selected image according to the reduction parameter set by the reduction control unit 17. The resolution conversion unit 158 performs resolution conversion (resizing) of the selected image according to the reduction parameter set by the reduction control unit 17 so as to obtain the minimum resolution (the number of pixels) that is necessary to perform the recognition/authentication process in the image reception device 20. The image encoding unit 159 encodes the selected image according to the reduction parameter set by the reduction control unit 17 so as to obtain the minimum encoding rate that is necessary to perform the recognition/authentication process in the image reception device 20.

The transmission unit 19 transmits the image output from the data reduction unit 15, and auxiliary information related to the image to the image reception device 20. As described above, images that are transmitted to the image reception device 20 by the transmission unit 19 are images (i.e., a data amount reduced image) in which an amount of data is reduced by selecting parts of images from the plurality of images that are continuously input to the image input unit 12 from the image pickup unit 11 as selected images, and by performing trimming, resizing, and encoding with respect to the selected images. In this manner, in the image transmission device 10, since parts of images are selected from the plurality of images, and a process (trimming, resizing, and encoding) of reducing the amount of data of the selected images themselves is performed, the amount of data of images that are transmitted from the image transmission device 10 to the image reception device 20 may be reduced. Accordingly, a load of the network NW and a processing load of the image reception device 20, or a necessary capacity of a database may be reduced.

On the other hand, in the best shot determination unit 151, an image that is suitable for the recognition/authentication process of the image reception device 20 is selected. In the trimming by the image data amount reduction unit 152, a region that is necessary for the recognition/authentication process of the image reception device 20 is extracted. In the resizing and encoding by the image data amount reduction unit 152, reduction of the amount of data is performed to a certain degree that is necessary for the recognition/authentication process of the image reception device 20. Accordingly, a decrease in accuracy of the recognition/authentication process in the image reception device 20 may be suppressed even by the reduction of the amount of data by the best shot determination unit 151 and the image data amount reduction unit 152.

FIG. 3 illustrates a block diagram illustrating a configuration of the image reception device 20. As illustrated in FIG. 3, the image reception device 20 includes a reception unit 21, an image decoding unit 22, a target analysis unit 23, a database 24, a mode setting unit 25, and a transmission unit 26. The image reception device 20 is constituted as an image recognition/authentication server that is connected to the image transmission device 10 constituted as a digital video camera.

The reception unit 21 receives the data amount reduced image and auxiliary information of the images which are transmitted from the transmission unit 19 of the image transmission device 10. The image decoding unit 22 decodes the images that are received. The target analysis unit 23 analyzes the decoded image and the auxiliary information, and performs the recognition/authentication process of a target. Examples of the recognition/authentication process herein includes recognition of age and gender from a face of a person, authentication of specific person from the face of the person, recognition of the number plate of the vehicle, and the like. The database 24 reserves the images that are decoded by the image decoding unit 22, and analysis results that may be obtained in the target analysis unit 23.

As illustrated in FIG. 3, a result display device 30 is further connected to the image reception device 20. For example, the result display device 30 is a liquid crystal display panel, and displays the images and/or the analysis results which are reserved in the database 24. FIG. 4 illustrates a diagram illustrating a display example of the analysis results. In the example of FIG. 4, a face of a person is set as a target, and age and gender thereof are recognized, and statics thereof are illustrated as a graph. When the image pickup unit 11 is provided at a store, and these analysis results are used, utilization for marketing activities is possible at the store.

Returning to FIG. 3, the mode setting unit 25 sets a mode of the recognition/authentication process that is performed in the target analysis unit 23. The target analysis unit 23 performs the recognition/authentication process according to the mode set in the mode setting unit 25. The transmission unit 26 transmits information (mode information) indicating the mode set in the mode setting unit 25 to the image transmission device 10.

FIG. 5 illustrates a diagram illustrating designation of a mode from the image reception device 20 with respect to the image transmission device 10. As illustrated in FIG. 5, mode information is transmitted from the image reception device 20 to the image transmission device 10. As described above, the mode information that is transmitted is received by the reception unit 18 of the image transmission device 10, and is used for a control in the reduction control unit 17. In the data reduction unit 15, the data amount reduced image is generated by a reduction method according to the mode information. The data amount reduced image that is generated as described above is transmitted from the image transmission device 10 to the image reception device 20. That is, when the image reception device 20 transmits the mode information of the recognition/authentication process which is set in the mode setting unit 25 to the image transmission device 10, a data amount reduced image which is appropriately selected according to the mode information and in which an amount of data is reduced is transmitted from the image transmission device 10.

Next, a relation between the mode of the recognition/authentication process of images, and a method of reducing the amount of data of images transmitted from the image transmission device 10 (selection of a best shot, and reduction of the amount of data of images themselves) will be described in detail. As described above, in the image transmission device 10, parts of images are selected from a plurality of images in the best shot determination unit 151, and a process (trimming, resizing, and encoding) of reducing the amount of data of the selected images themselves is performed in the image data amount reduction unit 152. Accordingly, a load of the network NW and a processing load of the image reception device 20, or a necessary capacity of the database may be reduced. However, there is a concern that when the number of images that are received by the image reception device 20 with respect to the same target is limited, accuracy of the recognition/authentication process in the image reception device 20 may decrease. In addition, there is a concern that when the amount of data of images received by the image reception device 20 is reduced, accuracy of the recognition/authentication process may decrease.

Therefore, in the image recognition/authentication system 100 of the embodiment, a reference during selection of images in the best shot determination unit 151 is set in such a manner that an image very suitable for the recognition/authentication process of the image reception device 20 is selected. Accordingly, the decrease in accuracy of the recognition/authentication process due to the limitation of the number of images that are received by the image reception device 20 with respect to the same target is suppressed. In addition, with regard to the reduction method during reduction of the amount of data of images in the image data amount reduction unit 152, setting is performed in such a manner that the amount of data is reduced in a range necessary for the recognition/authentication process of the image reception device 20. Accordingly, the decrease in accuracy of the recognition/authentication process due to the reduction of the amount of data of images that are received by the image reception device 20 is suppressed.

FIG. 6 illustrates a graph illustrating an example of a relation between the resolution (the number of pixels) and the accuracy of the recognition/authentication. As illustrated in FIG. 6, in a case of performing face detection (recognition as a face) as the recognition/authentication process, when resolution of approximately 12×12 is provided, determination may be made with accuracy of approximately 80%. In addition, in a case of performing gender determination as the recognition/authentication process, when resolution of approximately 60×60 is provided, determination may be made with accuracy of approximately 80%. In a case of performing age determination as the recognition/authentication process, resolution of approximately 80×80 is necessary to obtain accuracy of approximately 80%. As described above, resolution which is necessary to obtain constant accuracy is different depending on the content of the recognition/authentication process. That is, in the image recognition/authentication system 100, with regard to a face detection process which is performed in the image transmission device 10, and a gender determination process or an age determination process which is performed in the image reception device 20, necessary resolution is different in each case. Therefore, when images are selected in the image transmission device 10 without considering the recognition/authentication process that is performed in the image reception device 20, this selection may be not very suitable for the determination in the image reception device 20 in some cases, and thus deterioration in accuracy may occur.

As can be seen from FIG. 6, even in any recognition/authentication process, a degree of accuracy rising of recognition/authentication becomes gentle at constant resolution or higher. Accordingly, even in constant resolution or higher, an increase in accuracy of the recognition/authentication may not be expected with the proportion of increase in load applied to the network, load applied to the recognition/authentication process, or the like.

A table, which defines a corresponding relation between the content (mode) of the recognition/authentication process, and a reduction parameter including requirement for resolution or a high-frequency component, is stored in the parameter storage unit 16 of the image transmission device 10. FIG. 7 illustrates a table illustrating an example of the table that is stored in the parameter storage unit 16. Examples of the mode of the recognition/authentication process in the image reception device 20 include an age determination mode, a gender determination mode, a person recognition mode, a fashion popularity analysis mode, a body type determination mode, a race determination mode, a vehicle type determination mode, a number determination mode, a pet determination mode, and a person thumbnail display mode.

In the table, parameters of "detection target", "analysis target", "band", "region", "resolution", and "image quality" are defined with respect to the respective modes. In FIG. 6, with regard to "resolution", resolution that is necessary for each mode has been described. However, the same is true of "band", and "image quality". That is, images in which a high-frequency component is rich are necessary to perform recognition/authentication process with constant accuracy, but a degree thereof increases in the order of the face detection, the gender determination, and the age determination. In addition, when the high-frequency component increases to a certain degree, an increase in accuracy of the recognition/authentication process with respect to the increase in high-frequency component becomes gentle at the degree or higher. In addition, images with good image quality are necessary to perform the recognition/authentication process with constant accuracy, but a degree thereof increases in the order of the face detection, the gender determination, and the age determination. In addition, when the image quality becomes good to a certain degree, an increase in accuracy of the recognition/authentication process with respect to an increase in image quality becomes gentle at the degree or higher.

When describing in detail with reference to FIG. 7, for example, in the age determination mode, naturally, a preferential "detection target" becomes a person. In addition, the target analysis unit 23 determines the age of a person based on a face image of the person, and thus an "analysis target" becomes the face image. In addition, detailed information such as face winkles and a detailed position of each portion is necessary to determine the age from the face image, and thus a face image in which fogging or blur is less, and which includes a lot of high-frequency components is necessary. Accordingly, the "band" becomes a necessary high-frequency component.

The region that is necessary for the age determination includes only a face region, and information of a hair portion or the like is not necessary. Accordingly, the "region" becomes the face region. In addition, as illustrated in FIG. 6, resolution of approximately 80×80 is necessary for the age determination, and thus the "resolution" becomes high resolution. In addition, similarly, detailed analysis is performed to determine the age from the face image, and thus a sufficient amount of information is necessary. Accordingly, the image quality becomes high image quality. In addition, the image quality corresponds to an amount of encoding in the encoding, and thus high image quality represents that the amount of encoding after the encoding is much.

The reduction control unit 17 acquires each parameter corresponding to mode information received from the reception unit 18 with reference to the table stored in the parameter storage unit 16, and sets the acquired parameter with respect to the data reduction unit 15 and the like. Specifically, the reduction control unit 17 sets the "detection target" in the target detection unit, the "analysis target" in the target feature analysis unit 153, the "band" in the band component detection unit 154 and the necessary band extraction unit 157, the "region" in the necessary region extraction unit 156, the "resolution" in the resolution conversion unit 158, and the "image quality" in the image encoding unit 159, respectively.

Next, an operation of the image transmission device 10 will be described with reference to FIG. 8. FIG. 8 illustrates a flow diagram illustrating an image transmission method in the image transmission device 10. The flow diagram illustrated in FIG. 8 is executed according to an image transmission program that is installed in the image transmission device 10.

First, the image input unit 12 inputs images photographed by the image pickup unit 11 (step S81). As described above, images are continuously input to the image input unit 12 from the image pickup unit 11. However, the following flow is repeated for each one image (frame). When an image of one frame is input, the target is detected in the target detection unit 13 (step S82). At this time, a target to be detected by the target detection unit 13 is set as a "detection target" by the reduction control unit 17. Then, tracking of the detected target is performed by the target tracking unit 14 (step S83).

Next, the target tracking unit 14 determines whether or not a count value reaches a threshold value (step S84). The count value is the number of continuous frames in which the target is not detected, and the threshold value is a permitted number of continuous frames in which the target is not detected. In addition, the count value is maintained for each target, and the following flow is performed for each target. For example, in a case where two targets are present in a screen, the flow is performed with respect to the two targets, respectively. In a case where the count value does not reach the threshold value (NO in step S84), it is determined whether or not the target is detected (step S85). In a case where the target is detected (YES in step S85), the count value is reset (step S86), and the target feature analysis unit 153 performs feature analysis of the target (step S87). The target of the feature analysis at this time is set as "analysis target" by the reduction control unit 17. Next, the band component detection unit 154 detects a band component (step S88).

FIG. 9 illustrates a flow diagram illustrating a band component detection process in the band component detection unit 154 (step S88 in FIG. 8). First, the band component detection unit 154 analyzes a frequency of a region in which the target in the image is detected (step S82) (step S881). Next, the band component detection unit 154 calculates an amount of components of the "band" set by the reduction control unit 17 (step S882).

Returning to FIG. 8, next, the image selection unit 155 performs determination on a best shot (step S89). Specifically, the image selection unit 155 compares an image that is reserved as a best shot in a temporary storage buffer and an image that is handled at that time. From the comparison, when it is determined that the image is better than the image that is reserved on the basis of the results of the feature analysis by the target feature analysis unit 153, and the results of the band component detection by the band component detection unit 154 (YES in step S89), an image data reduction process is performed to update the image in the temporary storage buffer with the image that is handled at that time (step S90). When the image that is reserved is a better image (No in step S89), the temporary storage buffer is not updated, and processing of the image (frame) is terminated.

FIG. 10 illustrates a flow diagram illustrating an image data amount reduction process in the image data amount reduction unit 152 (step S90 in FIG. 8). The necessary region extraction unit 156 extracts a necessary region in an image according to the "region" set by the reduction control unit 17 (step S901). Next, the necessary band extraction unit 157 extracts a necessary band according to the "band" set by the reduction control unit 17 (step S902). Next, the resolution conversion unit 158 performs resolution conversion of an image according to the "resolution" set by the reduction control unit 17 (step S903). Next, the image encoding unit 159 encodes an image according to the "image quality" set by the reduction control unit 17 (step S904).

Returning to FIG. 8, the image data amount reduction unit 152 rewrites the image that is stored in the temporary storage buffer with a data amount reduced image in which an amount of data is reduced (data amount reduced image) by the image data amount reduction process (step S91), and processing of the image (frame) is terminated. When the process is repeated, and a target is temporarily not present in the image, the target is not detected in step S85 (No in step S85). Accordingly, the count value is incremented (step S92), and the processing of the image (frame) is terminated.

When frames in which a target is not detected continue, a process of terminating processes through step S85 to step S92 continues, and when the count value reaches a predetermined threshold value without being reset in this manner (NO in step S84), it is determined that tracking is completed (a tracking target completely disappears in front of a camera), the transmission unit 19 transmits an image (data amount reduced image) that is stored in the temporary storage buffer at that time (step S93).

As described above, according to the image recognition/authentication system 100 of the embodiment, the best shot determination unit 151 of the image transmission device 10 selects a best shot among input images, and thus the number of images that are transmitted from the image transmission device 10 to the image reception device 20 is limited. Accordingly, a load of network, a load of the recognition/authentication process or a necessary capacity for image storage in the image reception device 20 may be reduced. In addition, the image data amount reduction unit 152 of the image transmission device 10 performs a process of reducing an amount of data by a method such as trimming, resizing, and encoding with respect to the images that are transmitted, and thus in this respect, the load of network, the load of the recognition/authentication process or the necessary capacity for image storage in the image reception device 20 may also be reduced. In addition, any of the selection of the best shot by the best shot determination unit 151, and the reduction of the amount of image data by the image data amount reduction unit 152 may be performed.

In the image recognition/authentication system 100 of the embodiment, the best shot determination and the image data amount reduction process in the image transmission device 10 are performed by a method suitable for the recognition/authentication process of images in the image reception device 20, the amount of data that is transmitted is simply reduced, but also a decrease in accuracy of the recognition/authentication process in the image reception device 20 due to the reduction of the amount of data may be suppressed.

With regard to the image recognition/authentication system 100, various modifications may be made. Hereinafter, several specific examples thereof will be described. Any of the best shot determination unit 151 and the image data amount reduction unit 152 may not be proved as described above. Furthermore, only a part of configuration of the image data amount reduction unit 152 may not be provided.

In addition, in the embodiment, the image transmission device 10 is provided with the parameter storage unit 16 that stores the table defining the corresponding relation between the recognition/authentication modes of images and various kinds of parameters related to a method of reducing an amount of data to be transmitted, the reception unit 18 receives mode information from the image reception device 20, and the reduction control unit 17 sets various kinds of parameters corresponding to the mode information. However, the invention is not limited thereto. For example, the mode information may be received from other than the image reception device 20. In addition, an input unit may be provided in place of the reception unit 18, and the mode information may be input by a user in the image transmission device 10.

In addition, in the embodiment, the image selection unit 155 selects only one best image (best shot) according to conditions set by the reduction control unit 17. However, the image selection unit 155 may select predetermined sheets of best images, or may select all of images satisfying predetermined conditions (without limitation to the number of images).

Furthermore, the image reception device 20 may be provided with the parameter storage unit that stores the table, and may transmit various kinds of parameters corresponding to the mode of the recognition/authentication process of images to the image transmission device 10. In this case, the parameter storage unit 16 is not necessary for the image transmission device 10, and the reception unit 18 receives the various kinds of parameters, and the reduction control unit 17 sets the parameters. FIG. 11 illustrates a diagram illustrating the modification example.

When the mode is set, the image reception device 20 reads out the various kinds of parameters corresponding to the mode with reference to the table, and transmits the parameters as information indicating a reduction method to the image transmission device 10. In the image transmission device 10, the reception unit 18 receives the information, and the reduction control unit 17 sets the various kinds of parameters according to the information. The image transmission device 10 generates a data amount reduced image by a reduction method according to the parameters and transmits the data amount reduced image to the image reception device 20. In the image reception device 20, the recognition/authentication process is performed with respect to the data amount reduced image transmitted from the image transmission device 10. However, at this time, when accuracy of the recognition/authentication is not good, a parameter making the accuracy of the recognition/authentication good is designated to the image transmission device 10. The image transmission device 10 generates a data amount reduced image according to the parameter designated by the image reception device 20, and transmits the image to the image reception device 20.

In addition, in the image recognition/authentication system 100 of the embodiment, one image transmission device 10 and one image reception device 20 are connected through the network NW, but a system configuration is not limited thereto. FIG. 12 is a diagram illustrating another example of the system configuration. In this example, the image transmission device 10 and the image reception device 20 are directly connected to each other without through a network. FIG. 13 illustrates a diagram illustrating still another example of the system configuration. As illustrated in FIG. 13, a plurality of image transmission devices 10 and a plurality of image reception devices 20 may be connected to each other through the network NW. In addition, only the image transmission device 10 may be plural in number and may be connected to one image reception device 20 through the network NW.

Hereinbefore, preferred embodiment of the invention has been described, but various modifications may be made with respect to the embodiment. All of the modifications within the true spirit and scope of the invention are intended to be included in the attached claims.

The invention has an effect capable of reducing the network load and the cost of a server, and of suppressing a decrease in accuracy of the recognition/authentication process due to the reduction of an amount of data, and thus the invention is useful as an image recognition/authentication system that performs recognition or authentication of images that are continuously input, and the like.

What is claimed is:

1. An image transmission device transmitting an image to an image reception device configured to perform a plurality of recognition/authentication processes, the image transmission device configured to perform a plurality of data reduction processes each corresponding to one of the plurality of recognition/authentication processes to be performed in the image reception device, the image transmission device comprising:
    an image pickup that photographs an image;
    a memory that stores instructions; and
    a processor that, when executing the instructions stored in the memory, performs a process comprising:
    receiving information with respect to a recognition/authentication process selected by the image reception device from the plurality of recognition/authentication processes, the selected recognition/authentication process being performed in the image reception device, the image reception device comprising a first processor;
    setting a target, the target being predetermined based upon the selected recognition/authentication process;
    inputting a plurality of frames of image data based upon images photographed by the image pickup;
    performing one of the plurality of data reduction processes corresponding to the selected recognition/authentication process for reducing a data amount of the input plurality of frames, the data reduction process, performed by the image transmission device, comprising selecting a frame from the input plurality of frames of image data, the selected frame including an object corresponding to the set target for the selected recognition/authentication process to be performed in the image reception device, and reducing the amount of data of the selected frame for generating a reduced frame;
    encoding the reduced frame based on an encoding process; and
    transmitting the encoded frame to the image reception device that performs the selected recognition/authentication process on the encoded frame,
    wherein the frame selecting compares a current frame of image data from the image pickup with a stored frame and chooses the selected frame based upon a predetermined criteria,
    wherein a non-selected frame, which is different from the selected frame and is not selected from the input plurality of frames of image data, is not transmitted to the image reception device.

2. The image transmission device according to claim 1, wherein the processor, executing the instructions, further performs a process comprising:
  extracting a portion of the selected frame such that the extracted portion includes the object corresponding to the set target.

3. The image transmission device according to claim 1, wherein the processor, executing the instructions, further performs a process comprising:
  trimming a region of the selected frame, the region corresponding to the selected recognition/authentication process performed in the image reception device.

4. The image transmission device according to claim 1, wherein the processor, executing the instructions, further performs a process comprising:
  extracting a band component of the selected frame, the band component corresponding to the selected recognition/authentication process performed in the image reception device.

5. The image transmission device according to claim 1, wherein the processor, executing the instructions, further performs a process comprising:
  converting resolution of at least a part of the selected frame of image data corresponding to the recognition/authentication process performed in the image reception device.

6. The image transmission device according to claim 1, wherein, the selected frame is encoded in an encoding rate corresponding to the selected recognition/authentication process performed in the image reception device.

7. The image transmission device according to claim 1, further comprising:
  a storage memory that stores a relationship between a plurality of reduction methods and a plurality of modes, each mode indicating one of the recognition/authentication processes performed in the image reception device;
  wherein the processor, executing the instructions, further performs a process comprising:
  receiving a mode of the recognition/authentication process performed in the image reception device;
  determining the reduction method corresponding to the received mode with reference to the relationship stored in the storage memory, and
  reducing a data amount of the input plurality of frames of image data according to the determined reduction method including selecting the frame from the input plurality of frames of image data.

8. The image transmission device according to claim 1, wherein the processor, executing the instructions, further performs a process comprising:
  receiving information indicating a reduction method, and
  reducing a data amount of the input plurality of frames of image data according to the received reduction method including selecting a frame from the input plurality of frames of image data.

9. The image transmission device according to claim 1, wherein the set target of the recognition/authentication process is received from the image reception device, and
  the object included in the selected frame is determined based on the set target.

10. The image transmission device according to claim 1, wherein the selecting the frame comprising:
  selecting at least two frames including the object, from the input plurality of frames of image data, and
  selecting one of the at least two frames, according to a reduction method corresponding to the selected recognition/authentication process that is performed in the image reception device.

11. The image transmission device according to claim 1, wherein the selecting selects a frame based upon a detection of a band component having a predetermined level of importance.

12. The image transmission device according to claim 1, wherein reducing the amount of data comprises calculating and extracting, from the selected frame, a band suitable for performing the recognition/authentication process, based on a predetermined criteria.

13. The image transmission device according to claim 1, wherein reducing the amount of data comprises resizing of the selected frame according to a predetermined reduction parameter so as to obtain a minimum resolution necessary for the recognition/authentication process.

14. The image transmission device according to claim 13, wherein the resizing of the selected frame comprises obtaining a minimum number of pixels to perform the recognition/authentication process, based on the one of the plurality of recognition/authentication processes to be performed by the image reception device.

15. An image transmission method of transmitting an image to an image reception processor configured to perform a plurality of recognition/authentication processes, the image reception processor receiving an image from an image transmission processor that performs a plurality of data reduction processes, each corresponding to one of the plurality of the recognition/authentication processes to be performed in the image reception processor, the image transmission method comprising:
  receiving information with respect to a recognition/authentication process selected from the plurality of recognition/authentication processes, the selected recognition/authentication process being performed in the image reception processor;
  setting a target based upon an image received from an image pickup, the target being predetermined based upon the selected recognition/authentication process;
  inputting a plurality of frames of image data;
  performing one of the plurality of data reduction processes corresponding to the selected recognition/authentication process for reducing a data amount of the input plurality of frames, the data reduction process comprising selecting a frame from the input plurality of frames of image data, the selected frame including an object corresponding to the set target for the selected recognition/authentication process to be performed in the image reception processor, and reducing the amount of data of the selected frame for generating a reduced frame;
  encoding the reduced frame based on an encoding process; and
  transmitting the encoded frame to the image reception processor that performs the selected recognition/authentication process on the encoded frame,
  wherein the frame selecting compares a current frame of image data from the image pickup with a stored frame and chooses the selected frame based upon a predetermined criteria,
  wherein a frame which is different from the selected frame, and is not selected from the input plurality of frames of image data, is not transmitted to the image reception processor.

16. A non-transitory computer readable recording medium storing an image transmission program of transmitting an image to an image reception processor configured to perform a plurality of recognition/authentication processes, the image reception processor receiving an image from an image transmission processor that performs a plurality of data reduction processes, each corresponding to one of the plurality of the recognition/authentication processes to be performed in the image reception processor, the image transmission program causing a computer to perform a process comprising:

receiving information with respect to a recognition/authentication process selected from the plurality of recognition/authentication processes, the selected recognition/authentication process being performed in the image reception processor;

setting a target, the target being predetermined based upon the selected recognition/authentication process;

inputting a plurality of frames of image data based upon images received from an image pickup;

performing one of the plurality of data reduction processes corresponding to the selected recognition/authentication process for reducing a data amount of the input plurality of frames, the data reduction process comprising selecting a frame from the input plurality of frames of image data, the selected frame including an object corresponding to the set target for the selected recognition/authentication process to be performed in the image reception processor, and reducing the amount of data of the selected frame for generating a reduced frame;

encoding the reduced frame based on an encoding process; and transmitting the encoded frame to the image reception processor that performs the selected recognition/authentication process on the encoded frame, wherein the frame selecting compares a current frame of image data from the image pickup with a stored frame and chooses the selected frame based upon a predetermined criteria, wherein a non-selected frame, which is different from the selected frame and is not selected from the input plurality of frames of image data, is not transmitted to the image reception processor.

17. An image recognition/authentication system, comprising:

an image reception device configured to perform a plurality of recognition/authentication processes, and an image transmission device configured to transmit an image to the image reception device;

wherein the image transmission device performs a plurality of data reduction processes, each corresponding to one of the plurality of the recognition/authentication processes to be performed in the image reception device, the image transmission device includes:

an image pickup that photographs an image;
   a first memory that stores instructions; and
   a first processor that, when executing the instructions stored in the first memory, performs a process comprising:

receiving information with respect to a recognition/authentication process selected from the plurality of recognition/authentication processes, the selected recognition/authentication process being performed in the image reception device;

setting a target, the target being predetermined based upon the selected recognition/authentication process;

inputting a plurality of frames of image data based upon images from the image pickup;

performing one of the plurality of data reduction processes corresponding to the selected recognition/authentication process for reducing a data amount of the input plurality of frames, the data reduction process, performed by the image transmission device, comprising selecting a frame from the input plurality of frames of image data, the selected frame including an object corresponding to the set target for the selected recognition/authentication process to be performed in the image reception device, and reducing the amount of data of the selected frame for generating a reduced frame;

encoding the reduced frame based on an encoding process; and transmitting the encoded frame to the image reception device that performs the selected recognition/authentication process on the encoded frame, wherein the frame selecting compares a current frame of image data from the image pickup with a stored frame and chooses the selected frame based upon a predetermined criteria, wherein a frame which is different from the selected frame, and is not selected from the input plurality of frames of image data, is not transmitted to the image reception device, wherein the image reception device receives an image frame from the image transmission device and includes:

a second memory that stores instructions; and
   a second processor that, when executing the instructions stored in the second memory, performs a process comprising:

receiving the encoded frame transmitted from the image transmission device;

decoding the encoded frame to obtain a decoded selected frame; and performing the selected recognition/authentication process on the decoded selected frame.

18. An image reception device configured to perform a plurality of recognition/authentication processes, comprising:

a memory that stores instructions; and
   a processor that, when executing the instructions stored in the memory, performs a process comprising:

selecting a recognition/authentication process from the plurality of recognition/authentication processes;

receiving an image transmitted from an image transmission processor, the image transmission processor configured to perform a plurality of data reduction processes each corresponding to one of the plurality of recognition/authentication processes to be performed in the image reception device;

performing the selected recognition/authentication process on the received image; and transmitting mode information with respect to the selected recognition/authentication process to the image transmission processor, wherein the received image is an encoded frame which is generated in the image transmission processor by:

receiving, from the image reception device, the mode information with respect to the selected recognition/authentication process;

setting a target, the target being predetermined based upon the selected recognition/authentication process;

inputting a plurality of frames of image data based upon images received from an image pickup;

performing one of the plurality of data reduction processes corresponding to the selected recognition/authentication process for reducing a data amount of the input plurality of frames, the data reduction process comprising selecting a frame from the input plurality of frames of image data, the selected frame including an object corresponding to the set target for the selected recognition/authentication process to be performed in the image reception device, and reducing the amount of data of the selected frame for generating a reduced frame; and encoding the reduced frame based on an encoding process, to generate the encoded frame to be transmitted to the image reception device, wherein the frame selecting compares a current frame of image data from the image pickup with a stored frame and chooses the selected frame based upon a predetermined criteria, wherein a non-selected frame, which is different from the selected frame and is not selected from the input plurality of frames of image data, is not transmitted to the image reception device.

19. An image reception device, comprising:

a storage memory that stores a relationship between a plurality of recognition/authentication processes that are performed in the image reception device and a plurality of image reduction methods that are performed by a first processor;

a memory that stores instructions; and a second processor that, when executing the instructions stored in the memory, performs a process comprising:

selecting a recognition/authentication process from the plurality of recognition/authentication processes;

receiving an image transmitted from the first processor, the first processor configured to perform a plurality of image reduction methods each corresponding to one of the plurality of recognition/authentication processes to be performed in the image reception device;

performing the selected recognition/authentication process with respect to the received image;

determining an image reduction method with reference to the relationship stored in the storage memory, the determined image reduction method corresponding to the selected recognition/authentication process; and transmitting information with respect to the determined image reduction method to the first processor, wherein the received image is an encoded frame which is generated by the first processor by:

receiving information with respect to the image reduction method determined by the image reception device;

setting a target for the determined image reduction method, the target being predetermined based upon the selected recognition/authentication process;

inputting a plurality of frames of image data based upon images received from an image pickup;

performing the determined image reduction method corresponding to the selected recognition/authentication process for reducing a data amount of the input plurality of frames, the determined image reduction method comprising selecting a frame from the input plurality of frames of image data, the selected frame including an object corresponding to the set target for the determined image reduction method, and reducing the amount of data of the selected frame for generating a reduced frame; and encoding the reduced frame based on an encoding process, to generate the encoded frame to be transmitted to the image reception device, wherein the frame selecting compares a current frame of image data from the image pickup with a stored frame and chooses the selected frame based upon a predetermined criteria, wherein a non-selected frame, which is different from the selected frame and is not selected from the input plurality of frames of image data, is not transmitted to the image reception device.

* * * * *